(12) United States Patent
Detwiler et al.

(10) Patent No.: US 10,880,410 B2
(45) Date of Patent: Dec. 29, 2020

(54) PON DATA COMPRESSION FOR HIGH EFFICIENCY

(71) Applicant: ADTRAN, Inc., Huntsville, AL (US)

(72) Inventors: Thomas Detwiler, Huntsville, AL (US); Richard Lee Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 39 days.

(21) Appl. No.: 16/207,521

(22) Filed: Dec. 3, 2018

(65) Prior Publication Data

US 2019/0173980 A1 Jun. 6, 2019

Related U.S. Application Data

(60) Provisional application No. 62/594,835, filed on Dec. 5, 2017.

(51) Int. Cl.
*G06F 15/16* (2006.01)
*H04L 29/06* (2006.01)
*H04Q 11/00* (2006.01)

(52) U.S. Cl.
CPC .............. *H04L 69/04* (2013.01); *H04L 69/22* (2013.01); *H04Q 11/0066* (2013.01); *H04Q 11/0067* (2013.01); *H04Q 2011/0064* (2013.01)

(58) Field of Classification Search
CPC ................................ H04L 69/04; H04L 69/22
See application file for complete search history.

(56) References Cited

U.S. PATENT DOCUMENTS

| 2011/0131624 | A1* | 6/2011 | Wu | H04L 41/0226 725/111 |
| 2013/0315594 | A1* | 11/2013 | Liang | H04B 10/27 398/66 |
| 2014/0369365 | A1* | 12/2014 | Denio | H04L 69/16 370/474 |
| 2015/0230169 | A1* | 8/2015 | Hood | H04W 52/0216 370/311 |

FOREIGN PATENT DOCUMENTS

EP    2 314 002 A1    4/2011

OTHER PUBLICATIONS

International Search Report and Written Opinion of the International Searching Authority for PCT/US2018/063747, dated Feb. 21, 2019, 10 pages.
International Preliminary Report on Patentability in International Appln. No. PCT/US2018/063747, dated Jun. 9, 2020, 7 pages.

* cited by examiner

*Primary Examiner* — Yves Dalencourt
(74) *Attorney, Agent, or Firm* — Fish & Richardson P.C.

(57) ABSTRACT

Methods, systems, and apparatus for payload compression are disclosed. In one aspect, a determination is made that one or more fields of a packet to be transmitted are compressible based on a compression table. Prior to transmitting the packet and in response to the determination, the one or more fields of the packet are compressed based on the compression table. Compressing the one or more fields of the packet includes removing the one or more fields from the packet to generate a compressed packet. One or more bits in a header of the compressed packet are modified to indicate at least one compression entry in the compression table associated with the compression performed on the compressed packet.

20 Claims, 5 Drawing Sheets

PON DATA COMPRESSION FOR HIGH EFFICIENCY

CROSS-REFERENCE TO RELATED APPLICATIONS

This application claims priority to U.S. Provisional Application No. 62/594,835, filed Dec. 5, 2017, entitled "Compression Based PON Optimization," the entire disclosure of which is incorporated by reference herein.

BACKGROUND

This specification relates to Passive Optical Network (PON) data compression to improve efficiency.

In a PON, user data consumption/utilization continues to increase. Network operators are looking for ways to increase the amount of data that they can send over their networks.

SUMMARY

In general, one innovative aspect of the subject matter described in this specification can be embodied in methods for improving PON efficiency by compressing data before transmitting on a PON. One example computer-implemented method includes determining, by a first telecommunications device, that one or more fields of a packet to be transmitted are compressible based on a compression table, the compression table established by the first telecommunications device and a second telecommunications device, the compression table including a plurality of compression entries on a per-flow and per-direction basis, one or more compressible fields of the packet determined based on a compression entry in the compression table, and prior to transmitting the packet to the second telecommunications device and in response to determining that the one or more fields are compressible: compressing, by the first telecommunications device, the one or more fields of the packet based on the compression table, including removing the one or more fields from the packet to generate a compressed packet, and modifying, by the first telecommunications device, one or more bits in a header of the compressed packet, the modified one or more bits in the header of the compressed packet indicating at least one compression entry in the compression table associated with the compression performed on the compressed packet.

Particular embodiments of the subject matter described in this specification can be implemented so as to realize one or more of the following advantages. For example, the methods, devices, and/or systems described in the present disclosure can compress highly correlated data for each service flow per subscriber, so that transmitters can convey predicted data strings using fewer bits of overhead data over a PON. In other words, there is room in the per-packet overhead to convey a modest number of compression indexes to compress (e.g., remove) correlated data. Examples of correlated data include MAC addresses, Ethertypes, VLAN tag stacks, IP addresses, and Ethernet pad bytes, which can be properly detected prior to transmission, and are typically limited in range among one service flow from an individual subscriber. In doing so, packet transmission length can be reduced by a significant amount (e.g., dozens of bytes per packet). As a result, efficiency of the PON can be improved using data compression.

While some aspects of this disclosure refer to computer-implemented software embodied on tangible media that processes and transforms data, some or all of the aspects may be computer-implemented methods or further included in respective systems or devices for performing the described functionality. The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

This disclosure describes methods, systems, and apparatus for improving PON efficiency through the use of data compression. For example, a first telecommunications device (e.g., an Optical Line Terminal (OLT), or an Optical Network Unit (ONU)) can determine, in advance of transmitting a packet to a second telecommunications device, that one or more fields of the packet are compressible based on a compression table (e.g., one or more fields of the packet match a compression entry in the compression table). The compression table can be established by the first telecommunications device and the second telecommunications device prior to transmitting the packet. Prior to transmitting the packet to the second telecommunications device and in response to the determination, the first telecommunications device can compress the one or more fields of the packet based on the compression table (e.g., removing the one or more fields from the packet) to generate a compressed packet. In addition, the first telecommunications device can modify one or more bits in a header of the compressed packet to indicate at least one compression entry in the compression table associated with the compression performed on the compressed packet. Although this disclosure refers to passive optical telecommunications systems for purposes of example, the subject matter of this disclosure can be applied to other types of telecommunications systems or other systems that transmit highly correlated data for each service flow per subscriber.

A Passive Optical Network (PON), such as a Next-Generation Passive Optical Network 2 (NG-PON2) or a 10 Gbps Ethernet Passive Optical Network (10G-EPON), can provide a 10 Gbps data rate. As user data consumption/utilization continues to increase, demand for data rates may exceed the data rate of installed equipment. Network operators are looking for ways to improve PON efficiency, especially in the burst-mode upstream direction, so as to increase available link capacity.

In modern high-speed Internet service bundles, most packets to or from a subscriber feature numerous bytes that are constant for all packets within a service flow. For example, the MAC and IP addresses (e.g., subscriber's local gateway MAC and IP addresses, provider's broadband network gateway MAC and IP addresses), set of VLAN tags, and Ethertype are fields that occupy multiple bytes in a packet, but use only a few different values for those fields. Data that is already known to a receiver can be suppressed by a transmitter in order to preserve capacity of the communication channel.

To improve PON efficiency, an OLT and an ONU can be configured to optionally learn fields in a packet (typically within packet headers) that are common to a high percentage of packets within a service flow. For example, in an International Telecommunication Union (ITU) PON, an XGEM-ID (10-Gigabit-capable PON Encapsulation Method ID) can be used to identify a single service flow. In an Institute of Electrical and Electronics Engineers (IEEE) PON, LLID (Logical Link ID) can be used analogously. Over an in-band overhead channel (e.g., ONU management and control interface (OMCI) for ITU PON and Ethernet Operations Administration and Maintenance (OAM) for IEEE PON), a system can set up one or more compression entries in a compression table for each XGEM-ID/LLID (or less granular, for example for each subscriber or PON). A compression entry represents a string of bytes that is suitable for compression over a PON link. Once both sides (e.g., a transmitter and a receiver) have acknowledged existence of a compression entry, the transmitter (e.g., an OLT) can detect the presence of a string of characters, corresponding to the compression entry, at an anticipated location in a packet, remove the bytes corresponding to the string of characters from the packet, and use reserved encapsulation header bytes (e.g., Options byte in XGEM header, or one of the hexadecimal "55" bytes in Ethernet preamble of EPON packets) to indicate an identity of a compression action that is taken by the transmitter. Upon reception of the compressed packet, the receiver (e.g., an ONU) can determine which (if any) compression action was taken, and use its own table of compression indexes to re-insert the bytes that were removed by the transmitter.

At a high-level, the described approach provides a method to automatically perform compression on highly correlated data for each service flow per subscriber. Prior to transmitting a packet, a transmitter (at an OLT or at an ONU) can convey the predicted data strings using fewer bits of overhead data in the packet. Examples of correlated data include MAC addresses, Ethertypes, VLAN tag stacks, IP addresses, and Ethernet pad bytes, which can be properly detected prior to transmission, and are typically limited in range among one service flow (or a few) from an individual subscriber. For example, the predicted data strings can be removed from the packet, and one or more compression bits in the packet can be used to indicate the removal based on a compression table. A receiver (at an OLT or at an ONU) can re-insert the removed data strings based on the one or more compression bits and the compression table after receiving the compressed packet. In doing so, packet transmission length can be reduced by a significant amount (e.g., dozens of bytes per packet). The present disclosure discusses using, for example, header compression to 10-Gigabit-capable PON Encapsulation Method (XGEM) frames to avoid transmitting highly correlated header data, thereby reducing the amount of link capacity that is required to transmit the highly correlated header data and enabling that amount of link capacity to be used to transmit payload data (e.g., user data). As a result, PON efficiency can be improved using data compression. Any telecommunications system with highly correlated data for transmission may benefit from the subject matter described in this disclosure.

Figure 1:
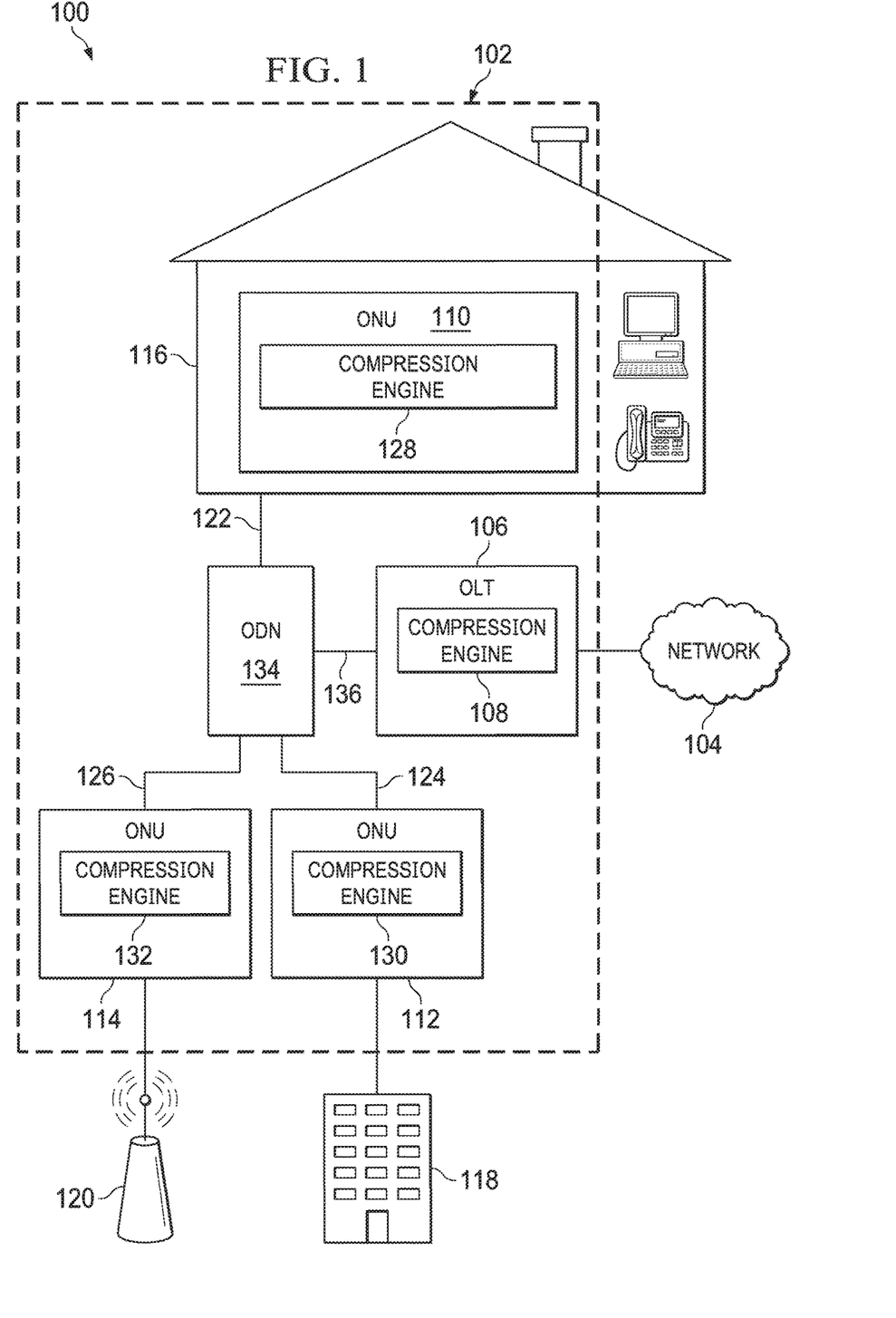
FIG. 1 is a block diagram illustrating an example networking environment for PON data compression, according to implementations of the present disclosure.

FIG. 1 a block diagram illustrating an example networking environment 100 for PON data compression, according to implementations of the present disclosure. As illustrated in FIG. 1, the environment 100 includes a PON 102 that connects users to a network 104. In some implementations, the environment 100 may include additional and/or different components not shown in the block diagram, such as one or more active optical networks (AONs), another type of network that provides network services (e.g., ADSL2+, VDSL2, etc.), or a combination of these and other technologies. In some implementations, components may also be omitted from the environment 100.

As illustrated, the PON 102 includes an OLT 106 at a service provider's central office (or other distribution point), an Optical Distribution Network (ODN) 134 (e.g., a passive optical splitter for the PON 102), an ONU 110 near residential locations 116, an ONU 112 near business locations 118, an ONU 114 near wireless communications equipment 120, a fiber optic link 136 connecting the OLT 106 and the ODN 134, a fiber optic link 122 connecting the ODN 134 and the ONU 110, a fiber optic link 124 connecting the ODN 134 and the ONU 112, and a fiber optic link 126 connecting the ODN 134 and the ONU 114. The OLT 106 is coupled to a number of ONUs 110, 112, and 114 (also referred to as optical network terminals (ONTs)), which are located near end users, thereby forming a point-to-multipoint network. For example, in the case of Next-Generation Passive Optical Network 2 (NG-PON2), a single OLT port can connect to 64 (or another number of) different ONUs.

Each ONU can include, or otherwise be coupled to, one or more customer-premises equipment (CPE) or subscriber devices (e.g., CPE modems). For example, the ONU 110 is a device that terminates the PON 102 at the customer end, and provides a service connection to a user living in the residential locations 116. The ONU 110 terminates optical fiber transmission, and can transform incoming optical signals into electrical signals, adapted for processing by subscriber devices. As a result, ONUs can provide network services, for example, to residential locations 116, business locations 118, or other forms of communications infrastructure, such as wireless communications equipment 120.

The OLT 106, as a network distribution element, provides an interface between the PON 102 and the network 104, and serves as the service provider's endpoint of the PON 102. The OLT 106 transmits downstream data traffic to ONUs (e.g., ONUs 110, 112, and 114), and receives upstream data traffic from the ONUs.

As illustrated, the OLT 106 includes a compression engine 108 that can establish a compression table with another compression engine in a telecommunications device that the OLT 106 is communicating with. In some implementations, the OLT 106 is responsible for management of the compression table. For example, the compression engine 108 can establish a compression table with another different compression engine 128 in the ONU 110 for data compression between the OLT 106 and the ONU 110. The compression engine 108 can establish a compression table with another different compression engine 130 in the ONU 112 for data compression between the OLT 106 and the ONU 112. The compression engine 108 can establish a compression table with a compression engine 132 in the ONU 114 for data compression between the OLT 106 and the ONU 114. In some implementations, the compression engine 108 can establish a single compression table for data compression with all coupled ONUs (e.g., 110, 112, and 114). In some cases, the compression engine 108 can establish a particular compression table for each coupled ONU. Although illustrated as the compression engine 108 in the OLT 106 in FIG. 1, a physical device or a software simulator running on any virtual or hardware machine may be used according to particular needs, desires, or particular implementations of the environment 100. Specifically, the compression engine 108 executes the algorithms and operations described in the illustrated figures, including the operations performing the functionality associated with the OLT 106 generally, as well as the various software modules, including the functionality for sending communications to and receiving transmissions from the ONUs (e.g., ONUs 110, 112, and 114).

In addition, the compression engine 108 can perform data compression and un-compression in downstream and upstream directions between the OLT 106 and its attached ONUs (e.g., ONUs 110, 112, and 114). For example, the compression engine 108 can perform data compression (e.g., header compression) prior to transmitting packets to the ONU 110 based on a compression table established between the OLT 106 and the ONU 110. In some cases, the compression engine 108 can determine that one or more fields of a packet to be transmitted match a compression entry in the compression table. Prior to transmitting the packet and in response to the determination, the compression engine 108 can remove the one or more fields from the packet to generate a compressed packet, and modify one or more bits in a header of the compressed packet to indicate the removal. As a result, instead of transmitting the original packet, the compressed packet with a shorter packet length than the original packet is transmitted. The compression engine 108 can also perform data un-compression after receiving compressed packets from the ONU 110 based on the compression table established between the OLT 106 and the ONU 110. For example, after receiving a compressed packet, the compression engine 108 can re-insert previously removed fields to the compressed packet based on compression bits in the header of the compressed packet and the compression table (e.g., obtaining the previously removed fields from the compression table).

For legacy ONUs (e.g., ONUs that do not support header compression), the OLT 106 will communicate with them without data compression and un-compression. Data compression and un-compression can be achieved independently in the upstream and downstream directions. In other words, compression entries in a compression table can be independent for upstream and downstream on bidirectional service flows.

Each ONU can include a compression engine. For example, the ONU 110 includes a compression engine 128. The ONU 112 includes a compression engine 130. The ONU 114 includes a compression engine 132. As a result, each ONU (e.g., a compression-capable ONU) can perform data compression (e.g., header compression) prior to transmitting packets to the OLT 106 based on a compression table established between the OLT 106 and the particular ONU. In addition, each ONU (e.g., a compression-capable ONU) can perform data un-compression after receiving compressed packets from the OLT 106 based on the compression table established between the OLT 106 and the particular ONU. The disclosed subject matter does not require all OLTs and/or ONUs on a same PON to support header compression. Legacy OLTs and/or ONUs (e.g., OLTs and/or ONUs that do not support header compression) can use, for example, reserved encapsulation header bytes (e.g., as currently defined in compression tables), which can be interpreted by a compression-capable receiver as an uncompressed transmission.

The new elements related to the compression tables in the ONUs and OLTs need to be managed, for example, using existing in-band management channels. For ITU PONs, a compression table can be established between an ONU and an OLT via OMCI. For IEEE PONs, a compression table can be established between an ONU and an OLT via Ethernet OAM. Furthermore, the OMCI or OAM management system is capable of querying OLTs and ONUs to understand their capabilities to participate in data compression, including any limitations of the implementation (i.e. a limited number of supported entries per XGEM/LLID, a limited length of entries, or limitations to only compress/expand the layer-2 (L2) header).

In some implementations, the operations performed by a compression engine (e.g., 108, 128, 130, or 132) can be implemented as operations performed by a data processing apparatus, on data stored on one or more computer-readable storage devices or received from other sources. The term "data processing apparatus" encompasses all kinds of apparatus, devices, and machines for processing data, including, by way of example, a programmable processor, a computer, a system on a chip, or multiple ones, or combinations of the foregoing. The compression engine (e.g., 108, 128, 130, or 132) can also be implemented as special purpose logic circuitry, for example, a field programmable gate array (FPGA) or an application specific integrated circuit (ASIC).

The network 104 facilitates wireless or wireline communications between the components of the PON 102 with any other local or remote computer, such as additional PONs, servers, or other devices communicably coupled to the network 104, including those not illustrated in FIG. 1. As illustrated in FIG. 1, the network 104 is depicted as a single network, but may be comprised of more than one network without departing from the scope of this disclosure.

In some situations, one or more of the illustrated components may be implemented, for example, as one or more cloud-based services or operations. The network 104 may be all or a portion of an enterprise or secured network, or at least a portion of the network 104 may represent a connection to the Internet, a public switched telephone network (PSTN), a data server, a video server, or additional or different networks. In some implementations, a portion of the network 104 may be a virtual private network (VPN). Further, all or a portion of the network 104 can comprise either a wireline or wireless link. Example wireless links may include 802.11ac/ad/af/a/b/g/n, 802.20, WiMax, LTE, free-space optical links, and/or any other appropriate wireless link. In other words, the network 104 encompasses any internal or external network, networks, sub-network, or combination thereof, operable to facilitate communications between various computing components, inside and outside the environment 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

Figure 2:
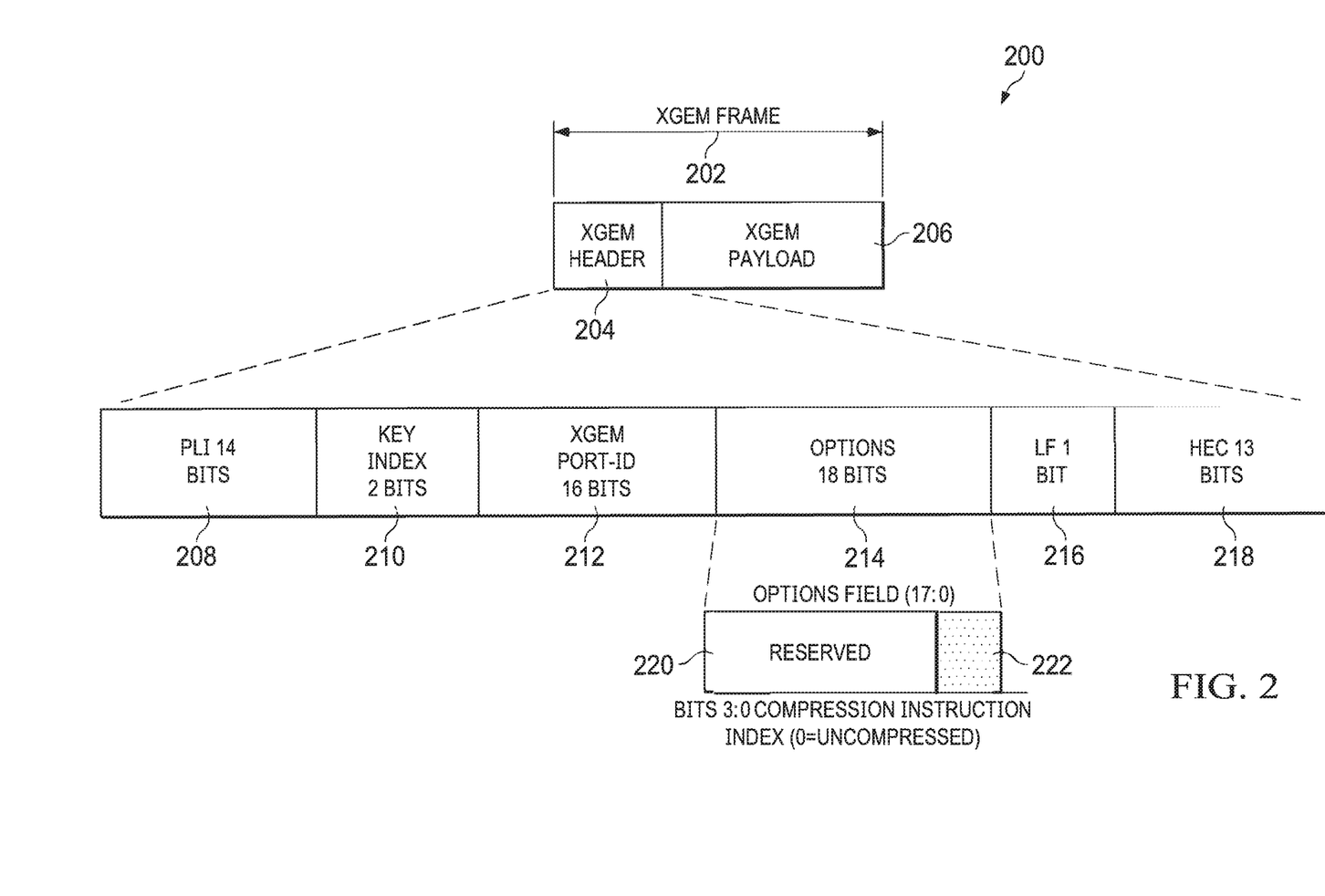
FIG. 2 is a diagram illustrating an example frame with an options field, according to implementations of the present disclosure.

FIG. 2 is a diagram illustrating an example frame 200 with an options field, according to implementations of the present disclosure. For purposes of example, the frame in FIG. 2 is an XGEM frame 202. The subject matter of this disclosure can be applied to fields in other types of frames.

As illustrated, the XGEM frame 202 includes an XGEM header 204 and XGEM payload 206. According to G.989.3, Sec. 9.1.2, the XGEM header 204 can include Payload Length Indicator (PLI) 208, Key index 210, XGEM Port-ID 212, Options 214, Last Fragment (LF) 216, and Header Error Control (HEC) 218. The existing Options 214 in the XGEM header 204 can be used to optionally encode headers or header fields. In some implementations, the Options 214 has 18 bits, and is set to 0x00000 (all bits set to zero) by a transmitter and ignored by a receiver. The Options 214 can store an index to an entire header (of varied length). The Options 214 can store an index for each of several well-known fields, including MAC DA, MAC SA, VLAN Tag stack, Ethertype, IP SA, and IP DA.

As illustrated in FIG. 2, the Options 214 can be used to include a reserved field 220 and a compression instruction index field 222. The compression instruction index field 222 can use bits 3:0 (from bits 17:0 in the Options field) as an index to a compression table. For example, an index of 0 (bits 3:0 with value of 0000) can indicate that the packet is not compressed. An index of 1 (bits 3:0 with value of 0001) can indicate that the packet is compressed according to the first compression entry in the compression table. As a result, bits 3:0 can index a total of 15 entries in the compression table. In some implementations, the Options 214 can be used differently to indicate one or more entries in one or more compression tables. For example, bits 1:0 can indicate which (of four) MAC destination address is compressed, bits 3:2 can indicate which (of four) MAC source address is compressed, bits 5:4 can indicate which (of four) Ethertype fields is compressed, and so on. In some implementations, the Options 214 can be used differently to indicate one or more entries in a compression table that is limited to a single instruction at a specified byte offset of the frame to be transmitted.

Figure 3:
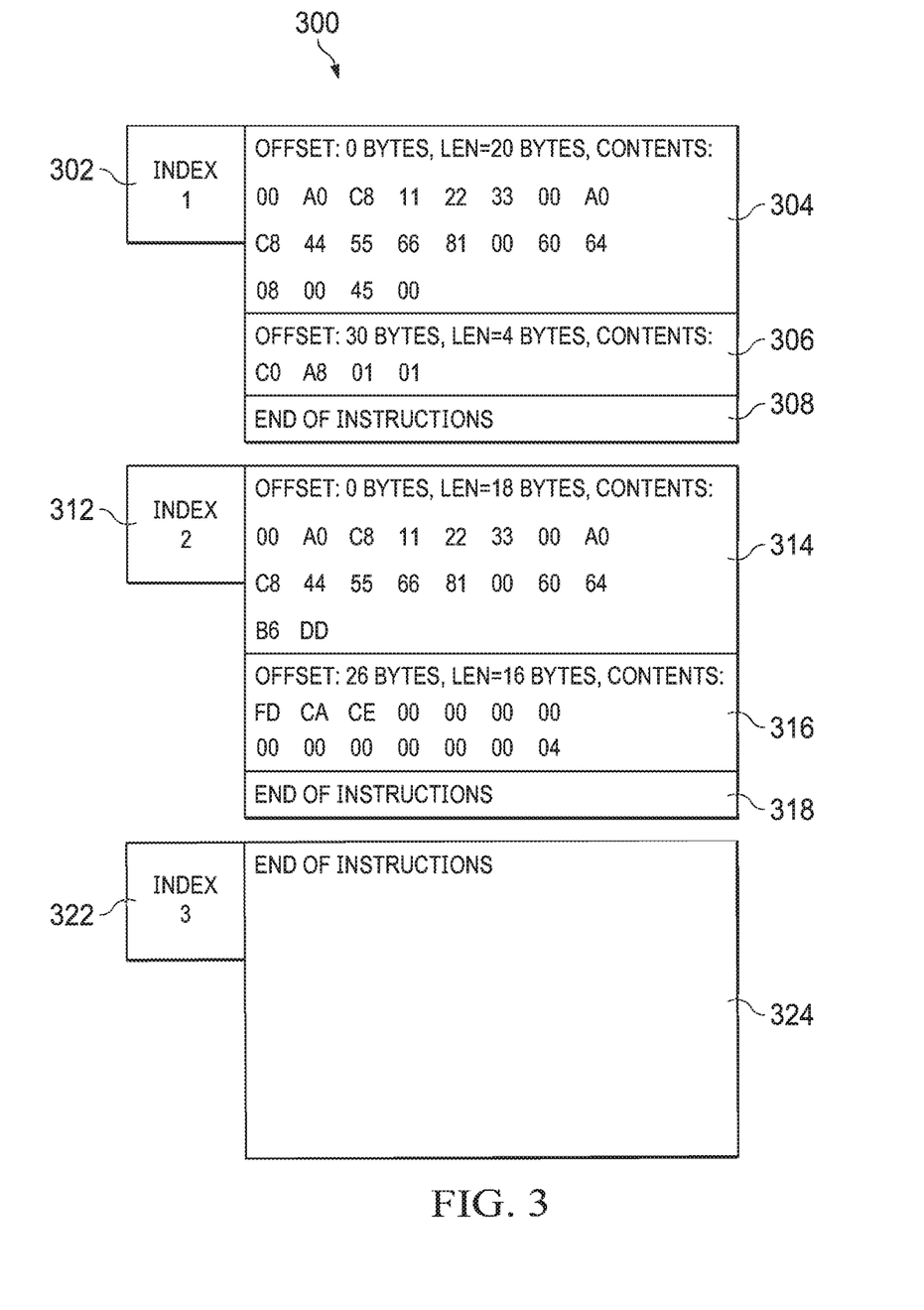
FIG. 3 is a diagram illustrating an example compression table, according to implementations of the present disclosure.

FIG. 3 is a diagram illustrating an example compression table 300, according to implementations of the present disclosure. As illustrated, the example compression table 300 includes three compression entries 302, 312, and 322. The compression entry 302 can be indexed by compression bits with a value of 1 (e.g., the compression instruction index field 222 in FIG. 2 with value of 0001). The compression entry 312 can be indexed by compression bits with a value of 2 (e.g., the compression instruction index field 222 in FIG. 2 with value of 0010). The compression entry 322 can be indexed by compression bits with a value of 3 (e.g., the compression instruction index field 222 in FIG. 2 with binary value of 0011).

As illustrated in FIG. 3, the compression entry 302 includes compression instruction 304, compression instruction 306, and end of instructions 308. For a transmitter, if a packet to be transmitted has two fields that match both the compression instruction 304 and the compression instruction 306, the transmitter can compress the packet according to the compression instruction 304 and the compression instruction 306, and set the compression bits with a value of 1 in the compressed packet to index the compression entry 302. For example, in a packet to be transmitted, if contents starting at the beginning of the packet (Offset: 0 bytes) with a length of 20 bytes match the hexadecimal string "00 A0 C8 11 22 33 00 A0 C8 44 55 66 81 00 60 64 08 00 45 00" and contents starting 30 bytes from the beginning of the packet (Offset: 30 bytes) with a length of 4 bytes match the hexadecimal string "C0 A8 01 01", both contents can be compressed (e.g., removed from the packet) by the transmitter. For a receiver, if compression bits in a received packets have a value indicating the compression entry 302 (e.g., a value of 1), the receiver knows that the received packet is a compressed packet. The receiver can re-insert "00 A0 C8 11 22 33 00 A0 C8 44 55 66 81 00 60 64 08 00 45 00" to the beginning of the received packet, and then re-insert "C0 A8 01 01" at a location with an offset of 30 bytes.

As illustrated, the compression entry 312 includes compression instruction 314, compression instruction 316, and end of instructions 318. Similar to the compression instruction 304 and the compression instruction 306 in the compression entry 302, the compression instruction 314 and the compression instruction 316 can be used by a transmitter to remove contents from a packet to be transmitted and by a receiver to re-insert contents to a received compressed packet. The compression entry 322 includes end of instructions 324 only. In other words, the compression entry 322 indicates no data compression.

As discussed above, in a PON access network, headers within an XGEM/LLID tend to be highly correlated. For example at layer-2, an UNI-side MAC address typically belongs to a remote gateway (RG), a network-side MAC address typically belongs to a broadband network gateway (BNG), a VLAN tag stack is statically provisioned, an Ethertype is typically IPv4, IPv6, or Address Resolution Protocol (ARP). In addition at layer-3 (L3), IP addresses of the RG and the BNG are also correlated, as well as IP protocol, traffic class/type of service, and flow label (where applicable), as well as layer-4 (L4) port numbers. Although many values of these fields are possible within a network, typically only a limited number of values are used within an XGEM/LLID. As a result, the frequently used headers can be learned by a transmitter and a receiver, and stored in a compression table (e.g., "C0 A8 01 01" stored in the compression instruction 306) for compressing data transmitted between the transmitter and the receiver. For example, known headers (e.g., stored in a compression table known to both the transmitter and the receiver) can be removed prior to transmission by the transmitter. XGEM header or Ethernet preamble can be used to identify the removed headers in the compression table. The known and removed headers can be re-inserted at the receiver.

In some implementations, the system can use OMCI messaging to define and manage known headers in a compression table. For example, an OLT can learn widely-used L2 headers on a per-XGEM, per-direction basis. The OLT can send to an ONU the identity of a new L2 header via OMCI. The identity includes byte string and length of the new L2 header. In some implementations, the identity includes individual L2 fields (e.g., MAC DA, MAC SA, VLAN tag stack, Ethertype) of the new L2 header. Once acknowledged by a transmitter and a receiver, the OLT (or ONU) transmitter can discard any matching header from a packet (e.g., header in a packet that matches one or more known headers) to be transmitted, and use the XGEM header Options field to indicate which known header should be attached at the receiver. Analogously to OMCI for ITU PONs, the same level of messaging and configuration may be achieved through OAM messaging for EPON.

In a residential PON, a large number of upstream packets are TCP Acks. Generally speaking, an untagged, unfragmented TCP Ack occupies 8 bytes of an XGEM header, 14 bytes of an Ethernet header, 20 bytes of an IP header for IPv4, 40 bytes of an IP header for IPv6, 20 bytes of a TCP header, 6 bytes of Ethernet pad for IPv4, 2 bytes of XGEM pad for IPv6, and 4 bytes of Ethernet FCS. As a result, an untagged, unfragmented TCP Ack occupies 72 bytes for IPv4 and 88 bytes for IPv6, including XGEM alignment overhead. By compressing the L2 overhead into existing XGEM header, only 60 bytes are occupied for IPv4 instead of 72 bytes, and only 72 bytes are occupied for IPv6 instead of 88 bytes. Using header compression of just the L2 header, the system can achieve 16.67% reduction and 18.18% reduction in transmitted packet size for IPv4 and IPv6, respectively. In addition, shorter packets can lead to fewer fragments, and hence less fragmentation overhead.

Note that the description above refers to L2 header compression, but there are many other compression options, and the techniques discussed above can be used (or modified) to allow for the use of other compression options. For example, IP source and destination addresses can be compressed. For IPv6, using a complex packet parser, 32 bytes can be reduced for each packet. Additional L3 and L4 header fields may also be considered, for example IP version, DiffServ, Flow Label, source port, and destination port. In addition, Ethernet pad for short frames can be compressed as well. For IPv4, frames with minimum length are padded. For IPv6, TCP frames with minimum length have no pad. In some implementations, L2 compression is similar to using IP as XGEM SDU instead of Ethernet. For example, "XGEM Type" field in XGEM Header Options can be used similar to "Ethertype" and IP can be passed through XGEM as a tunnel, and any additional compression could be considered for the remaining L3 and L4 header fields.

In some implementations, it is possible to achieve protocol-agnostic header compression by parsing packets prior to the transmitter to identify the highly correlated header fields (including L2, L3, L4, etc.), and creating a set of instruction strings for processing these fields. The instruction strings could either identify well-known header fields, or could generically identify byte offsets and lengths for headers to be removed (by transmitter) and reinserted (by receiver). Furthermore, the OMCI or OAM management system can be capable of querying OLTs and ONUs to understand their capabilities to participate in compression, including any limitations of the implementation (i.e. a limited number of supported entries per XGEM/LLID, a limited length of entries, or limitations to only compress/expand the L2 header).

Figure 4:
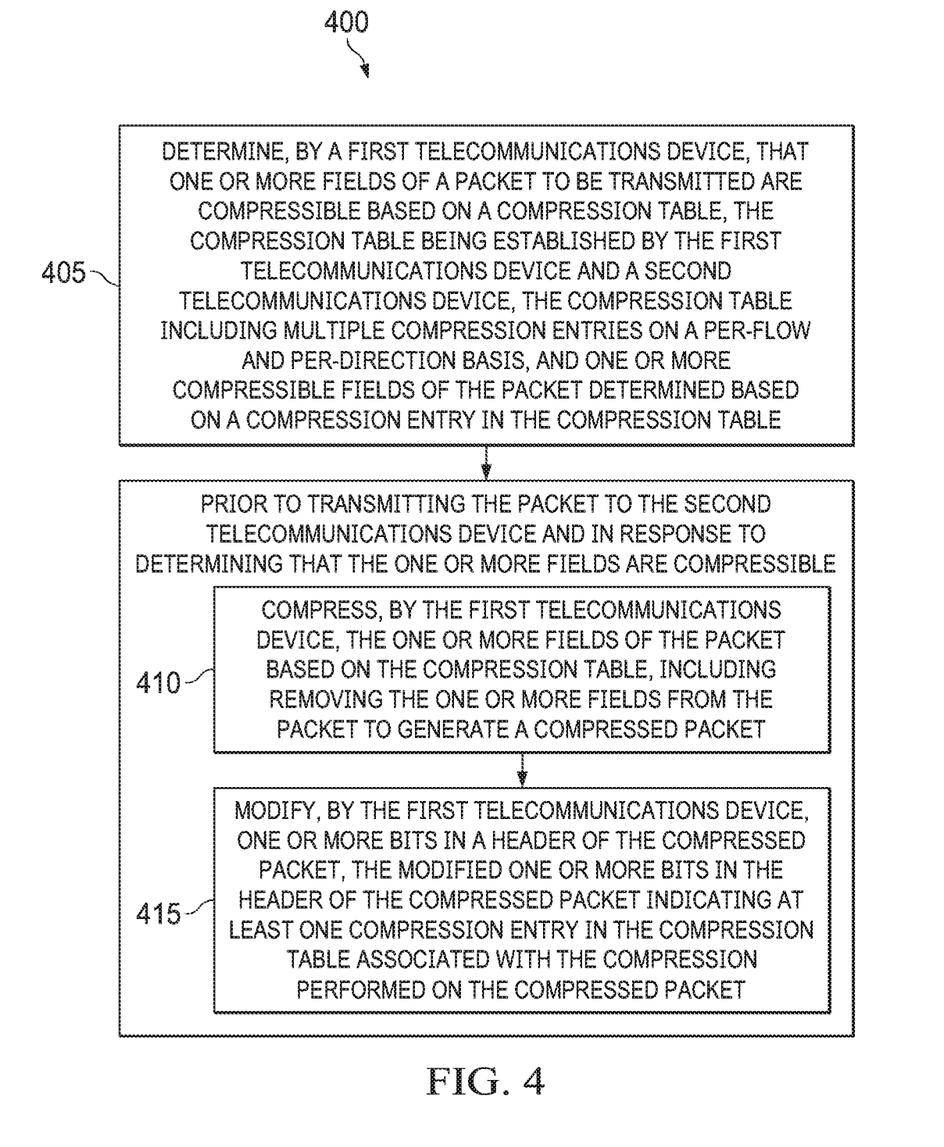
FIG. 4 is a flowchart of an example method for data compression in a PON, according to implementations of the present disclosure.

FIG. 4 is a flowchart of an example method 400 for data compression in a PON, according to implementations of the present disclosure. The example method 400 can be performed, for example, by one or more telecommunications devices, such as those described with reference to FIG. 1 (e.g., the OLT 106, the ONU 110, the ONU 112, and the ONU 114). The example method 400 can also be implemented as instructions stored on a non-transitory, computer-readable medium that, when executed by one or more telecommunications devices (and/or data processing apparatus), configures the one or more telecommunications devices to perform and/or cause the one or more telecommunications devices to perform the actions of the example method 400.

A determination is made, by a first telecommunications device, that one or more fields of a packet to be transmitted are compressible based on a compression table (405). In some implementations, the compression table is established by the first telecommunications device and a second telecommunications device. The compression table can be stored locally in the first telecommunications device and the second telecommunications device, or remotely to the first telecommunications device and the second telecommunications device. In some implementations, the compression table can include multiple compression entries on a per-flow and per-direction basis. For example, one or more compressible fields of the packet can be determined based on a compression entry in the compression table. In some implementations, the first telecommunications device and the second telecommunications device can establish each compression entry in the compression table by learning one or more common fields of packets within a particular service flow.

In some implementations, the first telecommunications device is an ONU in a PON, and the second telecommunications device is an OLT in the PON. In some cases, the first telecommunications device is the OLT in the PON, and the second telecommunications device is the ONU in the PON. For an ITU PON, the compression table can be established through OMCI (ONU management and control interface). Each compression entry in the compression table can be associated with an XGEM-ID identifying a distinct service flow. For an IEEE PON, the compression table can be established through Ethernet Operations Administration and Maintenance (OAM). Each compression entry in the compression table can be associated with an LLID identifying a distinct service flow. The LLID can include all pertinent LLID types, such as a Physical Layer ID (PLID), a Management Link ID (MLID), and a User Link ID (ULID).

In some implementations, the packet is encapsulated within an XGEM frame that includes an XGEM header and XGEM payload. The one or more bits are located in options field of the XGEM header (e.g., Options 214 in FIG. 2). The compression table includes the multiple compression entries on a per-XGEM and per-direction basis. Each compression entry can include at least one of an offset, a length, and compression contents. A value of zero represented by compression indication bits in a particular XGEM frame indicates that the particular XGEM frame is uncompressed. A value of non-zero represented by the compression indication bits in the particular XGEM frame indicates that the particular XGEM frame is compressed.

Prior to transmitting the packet to the second telecommunications device and in response to determining that the one or more fields are compressible, the one or more fields of the packet are compressed by the first telecommunications device and based on the compression table (410). In some implementations, compressing the one or more fields of the packet can include removing the one or more fields from the packet to generate a compressed packet. For example, a 64-byte packet with a 10-byte compressible field is to be transmitted, after removing the 10-byte compressible field from the 64-byte packet, a 54-byte compressed packet is transmitted instead of the 64-byte packet.

One or more bits in a header of the compressed packet are modified by the first telecommunications device (415). In some implementations, the modified one or more bits in the header of the compressed packet indicate at least one compression entry in the compression table associated with the compression performed on the compressed packet.

The example method 400 shown in FIG. 4 can be modified or reconfigured to include additional, fewer, or different actions (not shown in FIG. 4), which can be performed in the order shown or in a different order. For example, after 415, the compressed packet is received by the second telecommunications device. Based on the modified one or more bits in the header of the received packet, the second telecommunications device knows that the received packet is compressed. The second telecommunications device can uncompress the received packet based on the modified one or more bits in the header of the compressed packet and a compression table. In some implementations, uncompressing the received compressed packet can include place contents into the received compressed packet at associated locations to generate an uncompressed packet. The contents and the associated locations can be obtained from the compression table based on the modified one or more bits in the header of the compressed packet. The uncompressed packet, instead of the received compressed packet, can be transmitted by the second telecommunications device to a third telecommunications device. The third telecommunications device is a destination of the packet. In some implementations, one or more of the actions shown in FIG. 4 can be repeated or iterated, for example, until a terminating condition is reached. In some implementations, one or more of the individual actions shown in FIG. 4 can be executed as multiple separate actions, or one or more subsets of the actions shown in FIG. 4 can be combined and executed as a single action. In some implementations, one or more of the individual actions shown in FIG. 4 may also be omitted from the example method 400.

Figure 5:
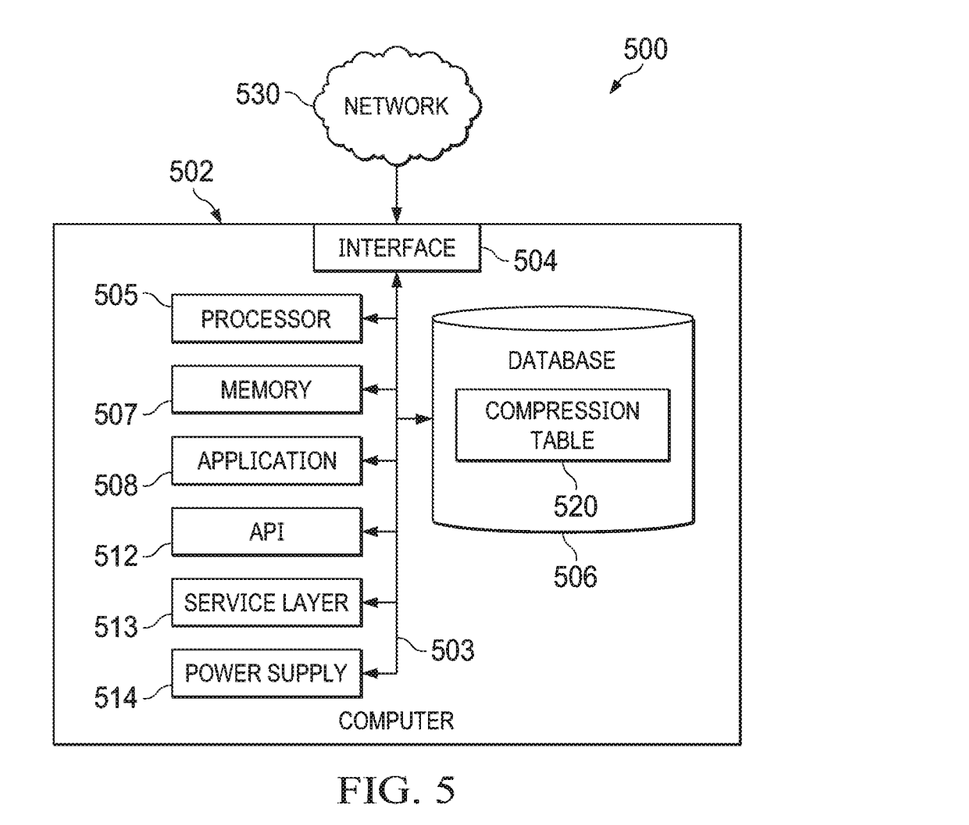
FIG. 5 is a block diagram illustrating an example of a computer system used to provide computational functionalities associated with described algorithms, methods, functions, processes, flows, and procedures, according to implementations of the present disclosure.

FIG. 5 is a block diagram illustrating an example of a computer system 500 used to provide computational functionalities associated with described algorithms, methods, functions, processes, flows, and procedures, according to implementations of the present disclosure. The illustrated computer 502 is intended to encompass any computing device such as a server, desktop computer, laptop/notebook computer, wireless data port, smart phone, personal data assistant (PDA), tablet computing device, one or more processors within these devices, another computing device, or a combination of computing devices, including physical or virtual instances of the computing device, or a combination of physical or virtual instances of the computing device. Additionally, the computer 502 can comprise a computer that includes an input device, such as a keypad, keyboard, touch screen, another input device, or a combination of input devices that can accept user information, and an output device that conveys information associated with the operation of the computer 502, including digital data, visual, audio, another type of information, or a combination of types of information, on a graphical-type user interface (UI) (or GUI) or other UI.

The computer 502 can serve in a role in a computer system as a client, network component, a server, a database or another persistency, another role, or a combination of roles for performing the subject matter described in the present disclosure. The illustrated computer 502 is communicably coupled with a network 530. In some implementations, one or more components of the computer 502 can be configured to operate within an environment, including cloud-computing-based, local, global, another environment, or a combination of environments.

At a high level, the computer 502 is an electronic computing device operable to receive, transmit, process, store, or manage data and information associated with the described subject matter. According to some implementations, the computer 502 can also include or be communicably coupled with a server, including an application server, e-mail server, web server, caching server, streaming data server, another server, or a combination of servers.

The computer 502 can receive requests over network 530 (for example, from a client software application executing on another computer 502) and respond to the received requests by processing the received requests using a software application or a combination of software applications. In addition, requests can also be sent to the computer 502 from internal users (for example, from a command console or by another internal access method), external or third-parties, or other entities, individuals, systems, or computers.

Each of the components of the computer 502 can communicate using a system bus 503. In some implementations, any or all of the components of the computer 502, including hardware, software, or a combination of hardware and software, can interface over the system bus 503 using an application programming interface (API) 512, a service layer 513, or a combination of the API 512 and service layer 513. The API 512 can include specifications for routines, data structures, and object classes. The API 512 can be either computer-language independent or dependent and refer to a complete interface, a single function, or even a set of APIs. The service layer 513 provides software services to the computer 502 or other components (whether illustrated or not) that are communicably coupled to the computer 502. The functionality of the computer 502 can be accessible for all service consumers using this service layer. Software services, such as those provided by the service layer 513, provide reusable, defined functionalities through a defined interface. For example, the interface can be software written in JAVA, C++, another computing language, or a combination of computing languages providing data in extensible markup language (XML) format, another format, or a combination of formats. While illustrated as an integrated component of the computer 502, alternative implementations can illustrate the API 512 or the service layer 513 as stand-alone components in relation to other components of the computer 502 or other components (whether illustrated or not) that are communicably coupled to the computer 502. Moreover, any or all parts of the API 512 or the service layer 513 can be implemented as a child or a sub-module of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502. The interface 504 is used by the computer 502 for communicating with another computing system (whether illustrated or not) that is communicatively linked to the network 530 in a distributed environment. Generally, the interface 504 is operable to communicate with the network 530 and comprises logic encoded in software, hardware, or a combination of software and hardware. More specifically, the interface 504 can comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors can be used according to particular needs, desires, or particular implementations of the computer 502. Generally, the processor 505 executes instructions and manipulates data to perform the operations of the computer 502 and any algorithms, methods, functions, processes, flows, and procedures as described in the present disclosure.

The computer 502 also includes a database 506 that can hold data for the computer 502, another component communicatively linked to the network 530 (whether illustrated or not), or a combination of the computer 502 and another component. For example, database 506 can be an in-memory, conventional, or another type of database storing data consistent with the present disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases of similar or differing types can be used according to particular needs, desires, or particular implementations of the computer 502 and the described functionality. While database 506 is illustrated as an integral component of the computer 502, in alternative implementations, database 506 can be external to the computer 502. As illustrated, the database 506 holds the previously described compression table 520.

The computer 502 also includes a memory 507 that can hold data for the computer 502, another component or components communicatively linked to the network 530 (whether illustrated or not), or a combination of the computer 502 and another component. Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 or similar or differing types can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in the present disclosure. For example, application 508 can serve as one or more components, modules, or applications. Further, although illustrated as a single application 508, the application 508 can be implemented as multiple applications 508 on the computer 502. In addition, although illustrated as integral to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion or management circuits (including recharging, standby, or another power management functionality). In some implementations, the power-supply 514 can include a power plug to allow the computer 502 to be plugged into a wall socket or another power source to, for example, power the computer 502 or recharge a rechargeable battery.

There can be any number of computers 502 associated with, or external to, a computer system containing computer 502, each computer 502 communicating over network 530. Further, the term "client," "user," or other appropriate terminology can be used interchangeably, as appropriate, without departing from the scope of the present disclosure. Moreover, the present disclosure contemplates that many users can use one computer 502, or that one user can use multiple computers 502.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
    identifying, by a first telecommunications device in a passive optical network (PON) and within an encapsulation frame, a particular data string that is included in one or more fields of a payload of the encapsulation frame;
    creating, by the first telecommunication device and within a compression table, a particular compression entry specifying the particular data string based on the identification of the particular data string in the one or more fields;
    transmitting, by the first telecommunications device and over an in-band management channel of the PON to a second telecommunications device, data identifying the particular data string as an entry in the compression table;
    determining, by the first telecommunications device, that a field of a packet to be transmitted is compressible based on a first data string in the field matching the particular data string contained in the particular compression entry of the compression table; and
    prior to transmitting the packet to the second telecommunications device and in response to determining that the field is compressible based on the first data string in the field matching the particular data string contained in the particular compression entry:
        compressing, by the first telecommunications device, the packet based on the compression table, including:
            removing the field from the packet to generate a compressed packet; and
            modifying, by the first telecommunications device, one or more bits in a header of the compressed packet to indicate at least one compression entry in the compression table that contains the particular data string that was matched by the first data string of the field.

2. The method of claim 1, further comprising:
    receiving, by the second telecommunications device, the compressed packet; and
    uncompressing, by the second telecommunications device, the received compressed packet based on the modified one or more bits in the header of the compressed packet and the compression table, including placing contents into the received compressed packet at associated locations to generate an uncompressed packet, wherein the contents and the associated locations are obtained from the compression table.

3. The method of claim 2, further comprising:
transmitting, by the second telecommunications device, the uncompressed packet, instead of the received compressed packet, to a third telecommunications device, wherein the third telecommunications device is a destination of the packet.

4. The method of claim 1, wherein the first telecommunications device and the second telecommunications device establish each compression entry in the compression table by learning one or more common fields of packets within a particular service flow.

5. The method of claim 1, wherein:
the first telecommunications device is an optical network unit (ONU) in the Passive Optical Network (PON), and the second telecommunications device is an optical line terminal (OLT) in the PON; or
the first telecommunications device is the OLT in the PON, and the second telecommunications device is the ONU in the PON.

6. The method of claim 5, wherein:
the PON is an International Telecommunication Union (ITU) PON, the compression table is established through OMCI (ONU management and control interface), and each compression entry in the compression table is associated with an XGEM-ID identifying a distinct service flow; or
the PON is an Institute of Electrical and Electronics Engineers (IEEE) PON, the compression table is established through Ethernet Operations Administration and Maintenance (OAM), and each compression entry in the compression table is associated with a Logical Link ID (LLID) identifying a distinct service flow.

7. The method of claim 6, wherein the LLID is one of a Physical Layer ID (PLID), a Management Link ID (MLID), and a User Link ID (ULID).

8. The method of claim 1, wherein the packet is a 10-Gigabit-capable PON Encapsulation Method (XGEM) frame including an XGEM header and XGEM payload, the one or more bits are located in options field of the XGEM header, and the one or more fields are located in the XGEM payload.

9. The method of claim 8, wherein the compression table includes a plurality of compression entries on a per-XGEM and per-direction basis, and each compression entry includes at least one of an offset, a length, and compression contents.

10. The method of claim 9, wherein a value of zero represented by compression indication bits in a particular XGEM frame indicates that payload of the particular XGEM frame is uncompressed, a value of non-zero represented by the compression indication bits in the particular XGEM frame indicates that the payload of the particular XGEM frame is compressed, and the value of non-zero indicates one of more compression entries in the compression table.

11. A telecommunications device, comprising:
a memory; and
one or more processors coupled to the memory, wherein the one or more processors are configured to perform operations comprising:
identifying, in a passive optical network (PON) and within an encapsulation frame, a particular data string that is included in one or more fields of a payload of the encapsulation frame;
creating, within a compression table, a particular compression entry specifying the particular data string based on the identification of the particular data string in the one or more fields;
transmitting, over an in-band management channel of the PON to a second telecommunications device, data identifying the particular data string as an entry in the compression table;
determining that a field of a packet to be transmitted is compressible based on a first data string in the field matching the particular data string contained in the particular compression entry of the compression table; and
prior to transmitting the packet to the second telecommunications device and in response to determining that the field is compressible based on the first data string in the field matching the particular data string contained in the particular compression entry:
compressing the packet based on the compression table, including:
removing the field from the packet to generate a compressed packet; and
modifying one or more bits in a header of the compressed packet to indicate at least one compression entry in the compression table that contains the particular data string that was matched by the first data string of the field.

12. The telecommunications device of claim 11, the operations further comprising:
receiving, from the second telecommunications device, a second compressed packet; and
uncompressing the received second compressed packet based on one or more bits in a header of the received second compressed packet and the compression table, including placing contents into the received second compressed packet at associated locations to generate an uncompressed packet, wherein the contents and the associated locations are obtained from the compression table.

13. The telecommunications device of claim 12, the operations further comprising:
transmitting the uncompressed packet, instead of the received second compressed packet, to a third telecommunications device, wherein the third telecommunications device is a destination of the received second compressed packet.

14. The telecommunications device of claim 11, wherein the telecommunications device and the second telecommunications device establish each compression entry in the compression table by learning one or more common fields of packets within a particular service flow.

15. The telecommunications device of claim 11, wherein:
the telecommunications device is an optical network unit (ONU) in a Passive Optical Network (PON), and the second telecommunications device is an optical line terminal (OLT) in the PON; or
the telecommunications device is the OLT in the PON, and the second telecommunications device is the ONU in the PON.

16. The telecommunications device of claim 15, wherein:
the PON is an International Telecommunication Union (ITU) PON, the compression table is established through OMCI (ONU management and control interface), and each compression entry in the compression table is associated with an XGEM-ID identifying a distinct service flow; or the PON is an Institute of Electrical and Electronics Engineers (IEEE) PON, the compression table is established through Ethernet Operations Administration and Maintenance (OAM), and each compression entry in the compression table is associated with a Logical Link ID (LLID) identifying a distinct service flow.

17. The telecommunications device of claim 11, wherein the packet is a 10-Gigabit-capable PON Encapsulation Method (XGEM) frame including an XGEM header and XGEM payload, the one or more bits are located in options field of the XGEM header, and the one or more fields are located in the XGEM payload.

18. The telecommunications device claim 17, wherein the compression table includes a plurality of compression entries on a per-XGEM and per-direction basis, and each compression entry includes at least one of an offset, a length, and compression contents.

19. The telecommunications device claim 18, wherein a value of zero represented by compression indication bits in a particular XGEM frame indicates that payload of the particular XGEM frame is uncompressed, a value of non-zero represented by the compression indication bits in the particular XGEM frame indicates that the payload of the particular XGEM frame is compressed, and the value of non-zero indicates one of more compression entries in the compression table.

20. A telecommunications system, comprising a first telecommunications device and a second telecommunications device, the first telecommunications device configured to perform operations comprising:

identifying, in a passive optical network (PON) and within an encapsulation frame, a particular data string that is included in one or more fields of a payload of the encapsulation frame;

creating, within a compression table, a particular compression entry specifying the particular data string based on the identification of the particular data string in the one or more fields;

transmitting, over an in-band management channel of the PON to a second telecommunications device, data identifying the particular data string as an entry in the compression table;

determining that a field of a packet to be transmitted is compressible based on a first data string in the field matching the particular data string contained in the particular compression entry of the compression table; and prior to transmitting the packet to the second telecommunications device and in response to determining that the field is compressible based on the first data string in the field matching the particular data string contained in the particular compression entry:

compressing, by the first telecommunications device, the packet based on the compression table, including:

removing the field from the packet to generate a compressed packet; and     modifying, by the first telecommunications device, one or more bits in a header of the compressed packet to indicate at least one compression entry in the compression table that contains the particular data string that was matched by the first data string of the field.

\* \* \* \* \*

UNITED STATES PATENT AND TRADEMARK OFFICE
CERTIFICATE OF CORRECTION

PATENT NO. : 10,880,410 B2
APPLICATION NO. : 16/207521
DATED : December 29, 2020
INVENTOR(S) : Thomas Detwiler and Richard Lee Goodson It is certified that error appears in the above-identified patent and that said Letters Patent is hereby corrected as shown below:

In the Claims

Column 15, Line 58, Claim 10, delete "of more" and insert -- or more --

Column 17, Line 14, Claim 18, delete "claim" and insert -- of claim --

Column 17, Line 20, Claim 19, delete "claim" and insert -- of claim --

Column 17, Line 27, Claim 10, delete "of more" and insert -- or more --

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*